US010622729B2

(12) United States Patent
Geens et al.

(10) Patent No.: US 10,622,729 B2
(45) Date of Patent: Apr. 14, 2020

(54) NEAR-FIELD ANTENNA

(71) Applicant: NXP B.V., Eindhoven (NL)

(72) Inventors: Patrick Desiré Madeleine Geens, Boutersem (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/989,284

(22) Filed: May 25, 2018

(65) Prior Publication Data

US 2019/0363459 A1    Nov. 28, 2019

(51) Int. Cl.
| | |
|---|---|
| *H01Q 1/27* | (2006.01) |
| *H01Q 25/00* | (2006.01) |
| *H01Q 1/52* | (2006.01) |
| *H04B 5/00* | (2006.01) |

(52) U.S. Cl.
CPC ............ *H01Q 25/00* (2013.01); *H01Q 1/273* (2013.01); *H01Q 1/525* (2013.01); *H04B 5/0093* (2013.01)

(58) Field of Classification Search
CPC ............ H01Q 7/005; H01Q 7/02; H01Q 7/04; H01Q 7/06; H01Q 7/08; H01Q 25/00
See application file for complete search history.

(56) References Cited

U.S. PATENT DOCUMENTS

| | | | | |
|---|---|---|---|---|
| 4,407,000 | A | * | 9/1983 | Sasaki ...................... H01Q 1/36 343/726 |
| 8,746,574 | B2 | * | 6/2014 | Salfelner ................. G01S 13/75 235/492 |
| 9,197,986 | B1 | | 11/2015 | Kerselaers et al. |
| 2006/0044769 | A1 | * | 3/2006 | Forster ............. G06K 19/07749 361/760 |
| 2015/0318603 | A1 | | 11/2015 | Kerselaers et al. |
| 2017/0062949 | A1 | | 3/2017 | Kerselaers et al. |

FOREIGN PATENT DOCUMENTS

EP    3242355 A1    11/2017

* cited by examiner

*Primary Examiner* — Daniel Munoz (57) ABSTRACT

One example discloses a near-field antenna, comprising: a magnetic (H) field antenna; an electric (E) field antenna; wherein the E-field antenna is galvanically insulated from the H-field antenna; and wherein the E-field antenna is configured to be inductively charged by the H-field antenna.

19 Claims, 9 Drawing Sheets

NEAR-FIELD ANTENNA

The present specification relates to systems, methods, apparatuses, devices, articles of manufacture and instructions for near-field communications.

SUMMARY

According to an example embodiment, a near-field antenna, comprising: a magnetic (H) field antenna; an electric (E) field antenna; wherein the E-field antenna is galvanically insulated from the H-field antenna; and wherein the E-field antenna is configured to be inductively charged by the H-field antenna.

In another example embodiment, the E-field antenna is dielectrically coupled to the H-field antenna.

In another example embodiment, the H-field antenna is a small loop antenna; the E-field antenna is a short-loaded dipole antenna; and the short-loaded dipole antenna is configured to be charged by the small loop antenna;

In another example embodiment, the H-field antenna is a wire coil; the E-field antenna is a conductive structure; and the conductive structure is configured to be charged by the wire coil;

In another example embodiment, the coil includes a dielectric core including at least one of ferrite or air.

In another example embodiment, the H-field antenna includes a first and second portion; the E-field antenna, includes a planar surface and an opening; the H-field antenna is positioned within the opening; the first portion of the H-field antenna is on one side of the planar surface; and the second portion of the H-field antenna is on an opposite side of the planar surface.

In another example embodiment, the opening overlaps a center of the E-field antenna.

In another example embodiment, the first and second portions are substantially equal.

In another example embodiment, sizes of the first and second portions are mechanically adjustable.

In another example embodiment, a longitudinal axis of the H-field antenna is perpendicular to the planar surface of the E-field antenna.

In another example embodiment, the planar surface includes a slot coupling an outer edge of the planar surface and an inner edge at the opening.

In another example embodiment, further comprising, a set of feed points coupled to the magnetic field antenna; and a transmitter and/or receiver circuit; wherein the E-field antenna is galvanically insulated from the transmitter and/or receiver circuit.

In another example embodiment, the transmitter and/or receiver circuit includes at least one of: a variable tuning capacitor, a variable resistor, or a low noise amplifier.

In another example embodiment, the H-field antenna includes a wire coil; the E-field antenna includes a conductive structure; and the coil and conductive structure are in a same plane.

In another example embodiment, the near-field antenna is an electromagnetic induction (NFEMI) antenna;

In another example embodiment, the antenna is embedded within at least one of: a wearable device, a hearing aid, an earbud, a smart watch or a smart phone.

According to an example embodiment, a wearable device including a near-field antenna, wherein the near-field antenna comprises: a magnetic (H) field antenna; an electric (E) field antenna; wherein the E-field antenna is galvanically insulated from the H-field antenna; and wherein the E-field antenna is configured to be inductively charged by the H-field antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

Figure 1:
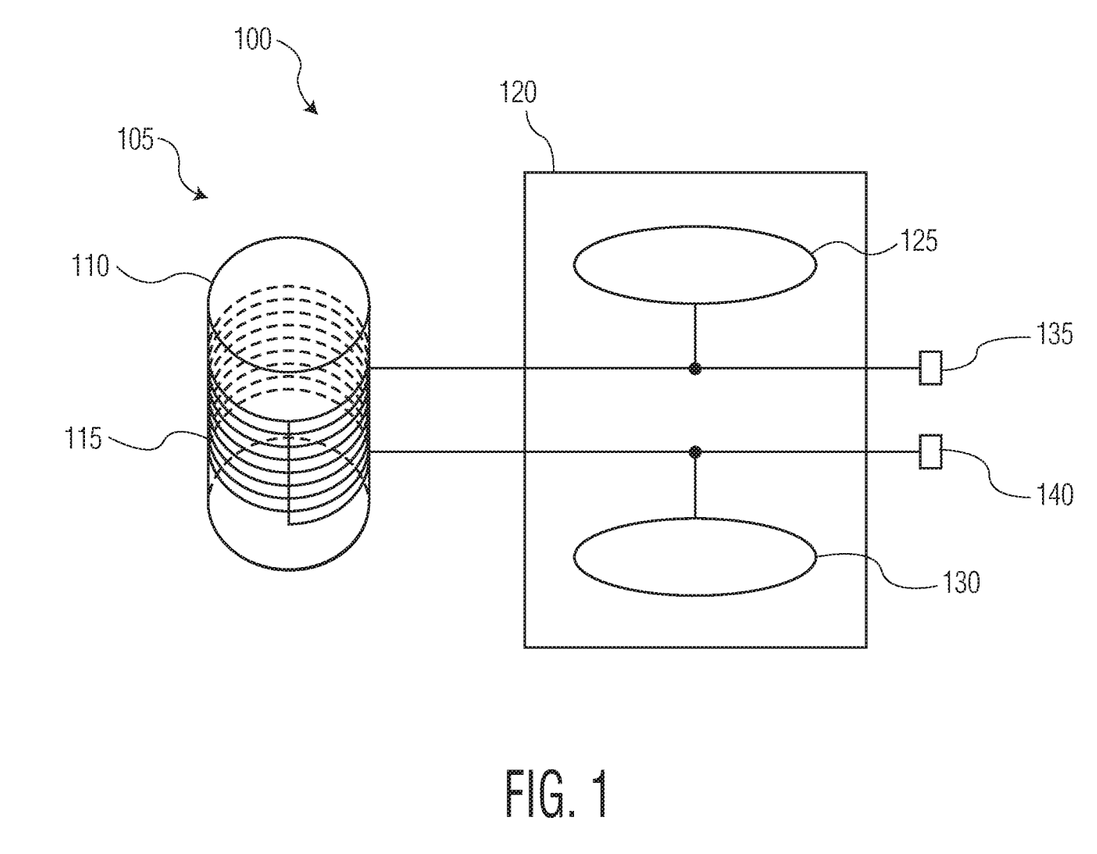
FIG. 1 is a first example near-field antenna.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include two loading plates 125 and 130. Antenna 100 feed points 135, 140 are coupled to various transceiver circuitry, such as downstream radio transmitter and receiver integrated circuit (RF-IC), (not shown here).

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Figure 2:
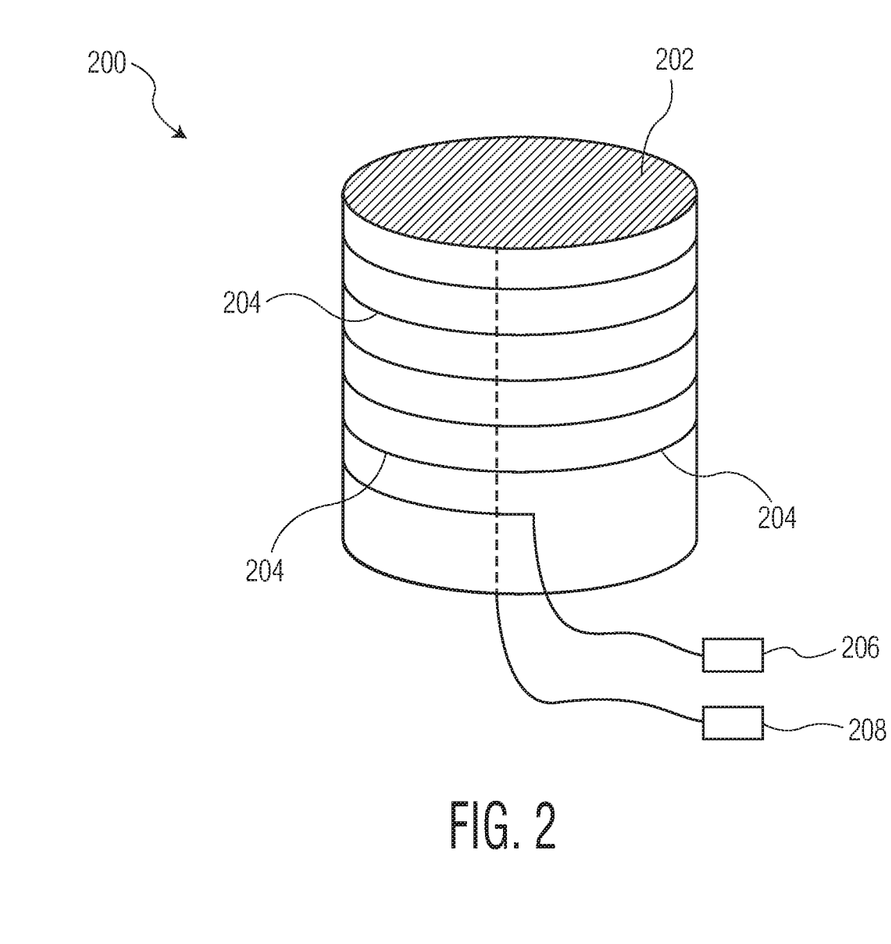
FIG. 2 is an example magnetic (H) field antenna for use in a second example near-field antenna.

FIG. 2 is an example magnetic (H) field antenna 200 for use in a second example near-field antenna. The H-field antenna 200 includes a dielectric core 202 (e.g. ferrite, air, etc.), a wire coil 204 (L), a first feed point 206 and a second feed point 208. The two feed points 206, 208 are respectively coupled to either end of the wire coil 204. In some example embodiments the H-field antenna 200 is a small loop antenna.

The core 202 and coil 204 dimensions are insignificant compared with the approximately 10 MHz near-field wavelength at which the H-field antenna 200 is operated.

Figure 4A:
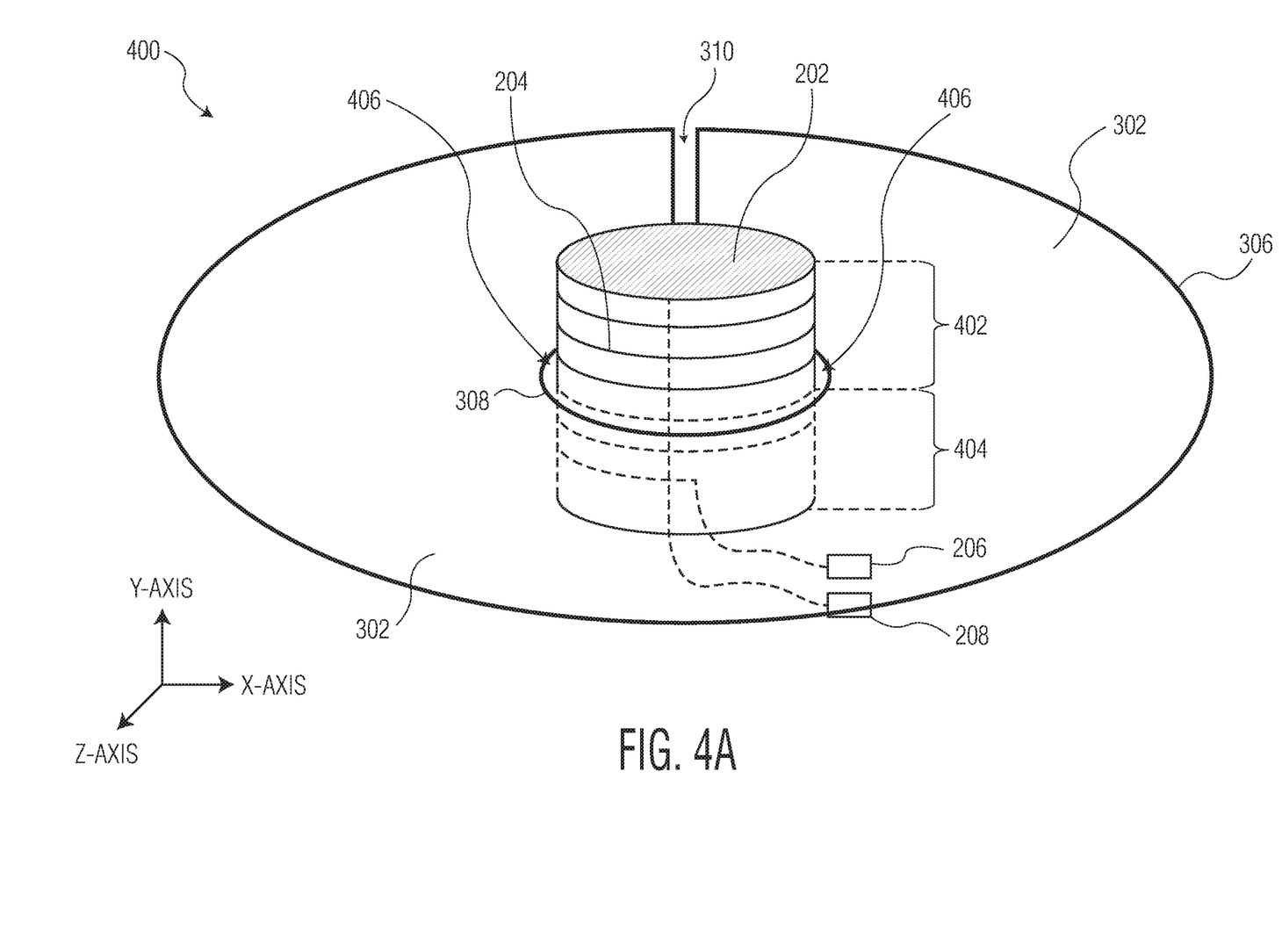
FIG. 4A is the second example near-field antenna.

The H-field antenna 200 is herein defined to have a longitudinal axis (y-axis) substantially perpendicular to a plane the spiral coil 204 windings, and a lateral axis (x-axis) substantially parallel to the plane of the spiral coil 204 windings. While in this example the magnetic (H) field antenna 200 is cylindrical, in other example embodiments the magnetic (H) field antenna 200 can be another shape, such as planar (e.g. see FIG. 4).

Figure 3:
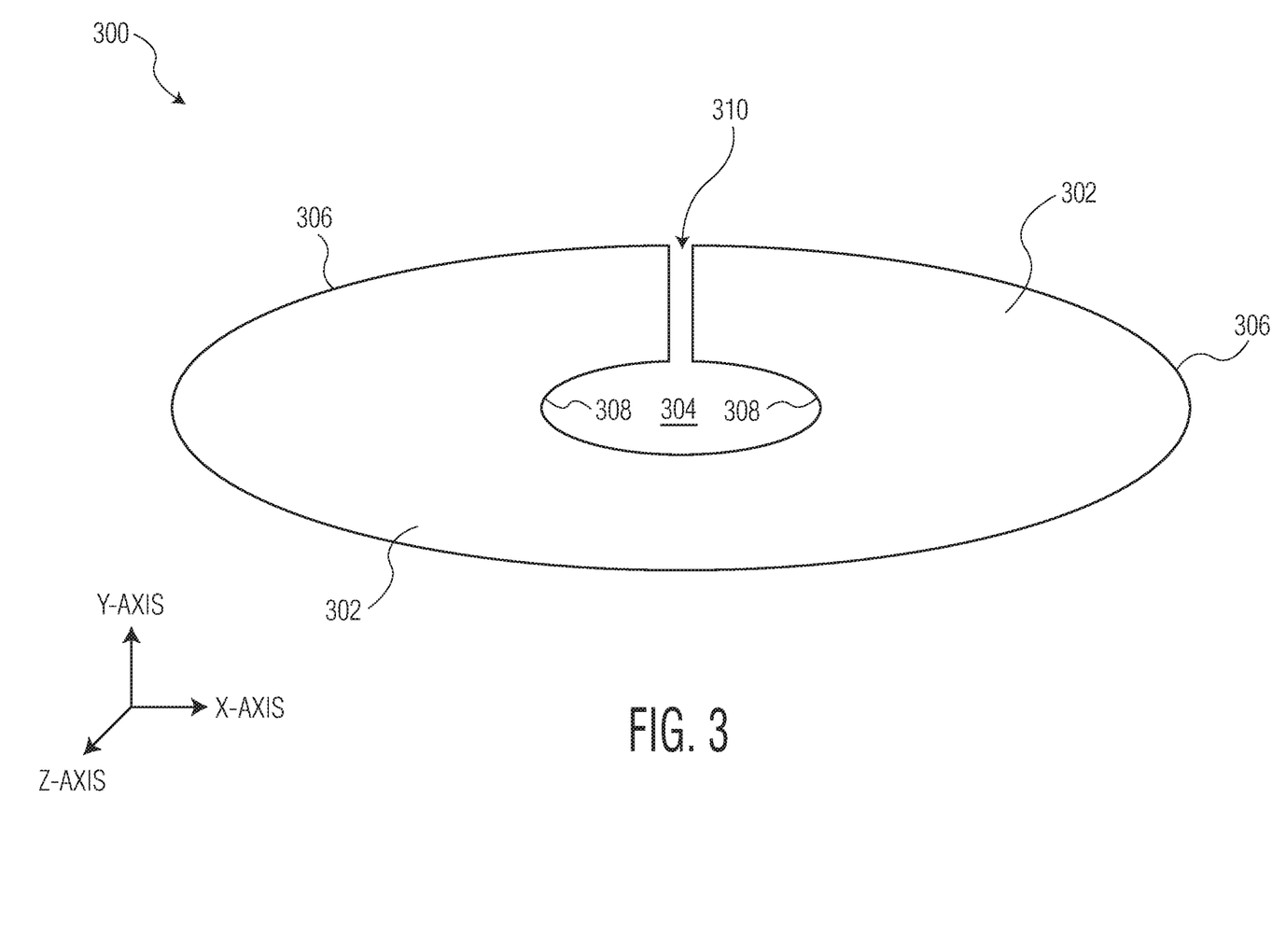
FIG. 3 is an example electric (E) field antenna for use in the second example near-field antenna.

FIG. 3 is an example electric (E) field antenna 300 for use in the second example near-field antenna. The E-field antenna 300 includes a conductive structure 302, an opening 304, an outer edge 306, an inner edge 308, and a slot 310 (e.g. gap, cavity). In some example embodiments the E-field antenna 300 is a short-loaded dipole antenna.

The conductive structure 302 shown in the example 300 is a planar (x-z plane) surface, however other two and three dimensional structures are also possible.

While the opening 304 shown overlaps a center of the conductive structure 302, in other example embodiments the opening 304 can be offset to another location within the conductive structure 302.

In this example embodiment the slot 310 couples the outer edge 306 and the inner edge 308 of the conductive structure 302. The slot 310 in some example embodiments is filled with a first substrate material. One side of the conductive structure 302 can be positioned "on top of" a second substrate material. Another side of the conductive structure 302 can be positioned "underneath" a third substrate material. The substrates can be laminated to the conductive structure 302.

These substrate materials can be different or the same. For example, the substrate in the slot 310 and on one side of the conductive structure 302 can be air while the substrate on the other side of the conductive structure 302 can be FR4.

FIG. 4A is the second example near-field antenna 400. The second near-field antenna 400 combines the magnetic (H) field antenna 200 and the electric (E) field antenna 300. The H-field antenna 200 is positioned within the opening 304 in the E-field antenna 300. The E-field antenna 300 is galvanically insulated 406 from (e.g. dielectrically coupled to) the H-field antenna 200.

The E-field antenna 300 is inductively charged by the H-field antenna 200. During operation, an RF current flowing through the wire coil 204 of the H-field antenna 200 results in a voltage across the coil 204 as well as the H-field antenna's 200 normal magnetic field. Then at a certain moment in time the top end of the coil 204 has a positive charge while the bottom end of the coil 204 has a negative charge, resulting in an electric field vector with a same orientation on both sides of the conductive structure 302. The electric field is largest near the coil 204 and attenuates going to the end of the conductive structure 302. However since the structure 302 is conductive the electric field is substantially uniform and an effective E-field antenna 300 is created. The slot 310 prevents eddy currents from inducing an opposite magnetic field and attenuating the electric field vector.

In various example embodiments the conductive structure 302 may or may not be connected to a ground potential.

The H-field antenna 200 can be understood to include a first 402 and second 404 portion. In some example embodiments the first portion 402 of the H-field antenna 200 is on one side of the conductive structure 302 and the second portion 404 of the H-field antenna 200 is on an opposite side of the conductive structure 302.

In some example embodiments the first and second portions 402, 404 are substantially equal; however, in other example embodiments sizes of the first and second portions 402, 404 are mechanically adjustable up or down for perhaps packaging and/or tuning purposes.

In some example embodiments, the longitudinal axis (y-axis) of the H-field antenna 200 is perpendicular to an x-z plane surface of the E-field antenna 300. However, in various other example embodiments, an angle between the longitudinal axis (y-axis) of the H-field antenna 200 and the E-field antenna 300 x-z plane can be other than perpendicular.

Figure 4B:
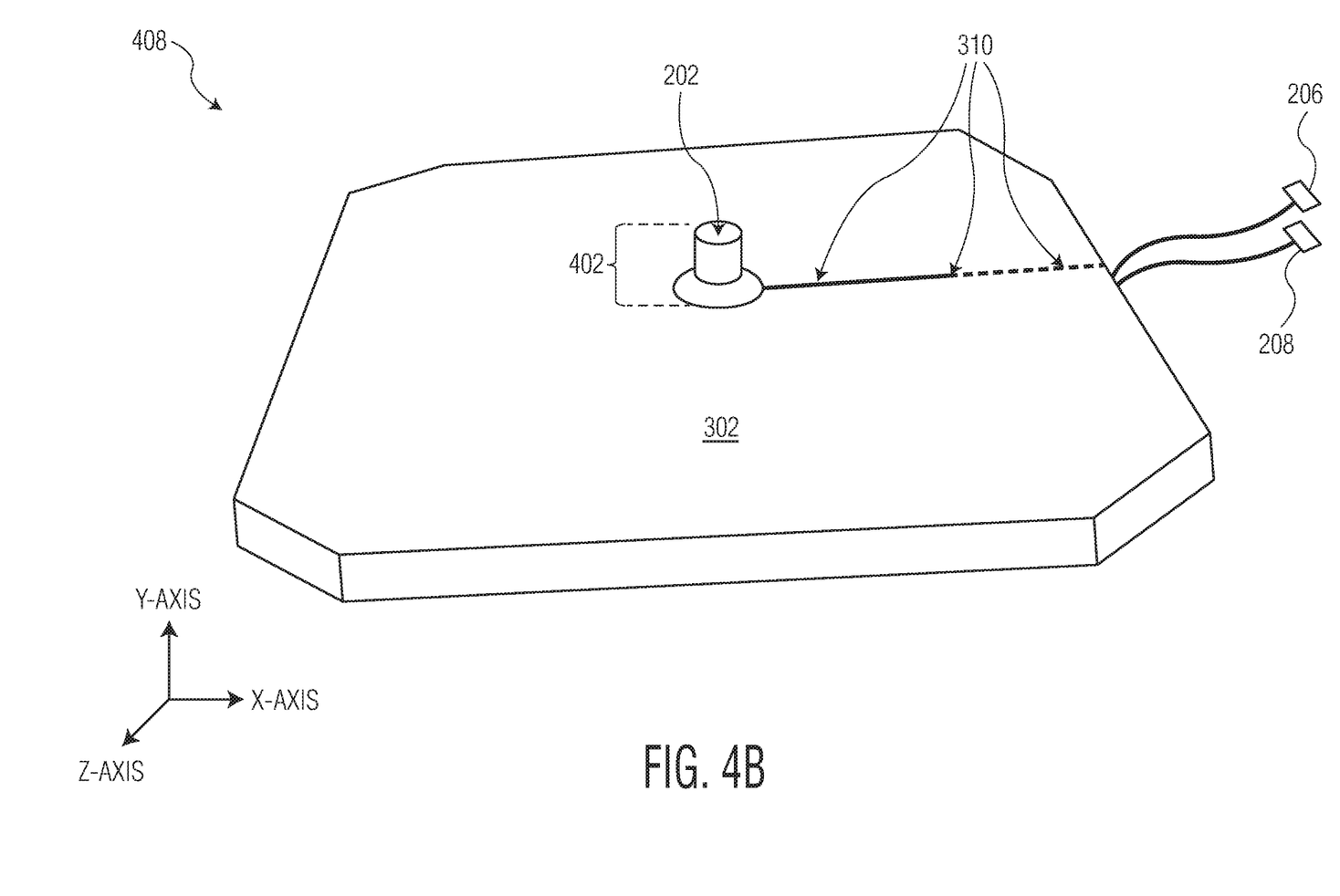
FIG. 4B is practical example of the second near-field antenna.

FIG. 4B is practical example 408 of the second near-field antenna 400. The practical example 408 the magnetic (H) field antenna 200 (see FIG. 2) has 20 windings on the ferrite core 202, a diameter of 2 mm, and a length of 6 mm. The inductance is 3.6 µH and the quality factor is 75.

The conductive structure 302 has a rectangular shape with dimensions of 32 by 29 mm. The conductive structure 302 material is a copper layer with a thickness of 35 µm.

The substrate material in the slot 310 and on top of the conductive structure 302 is air while the substrate on the bottom of the conductive structure 302 is FR4 material of 1.6 mm thickness, same shape as the conductive structure 302. From measurements, it is found that the antenna improves a received signal strength (RSSI) by about 14 dB.

Figure 5:
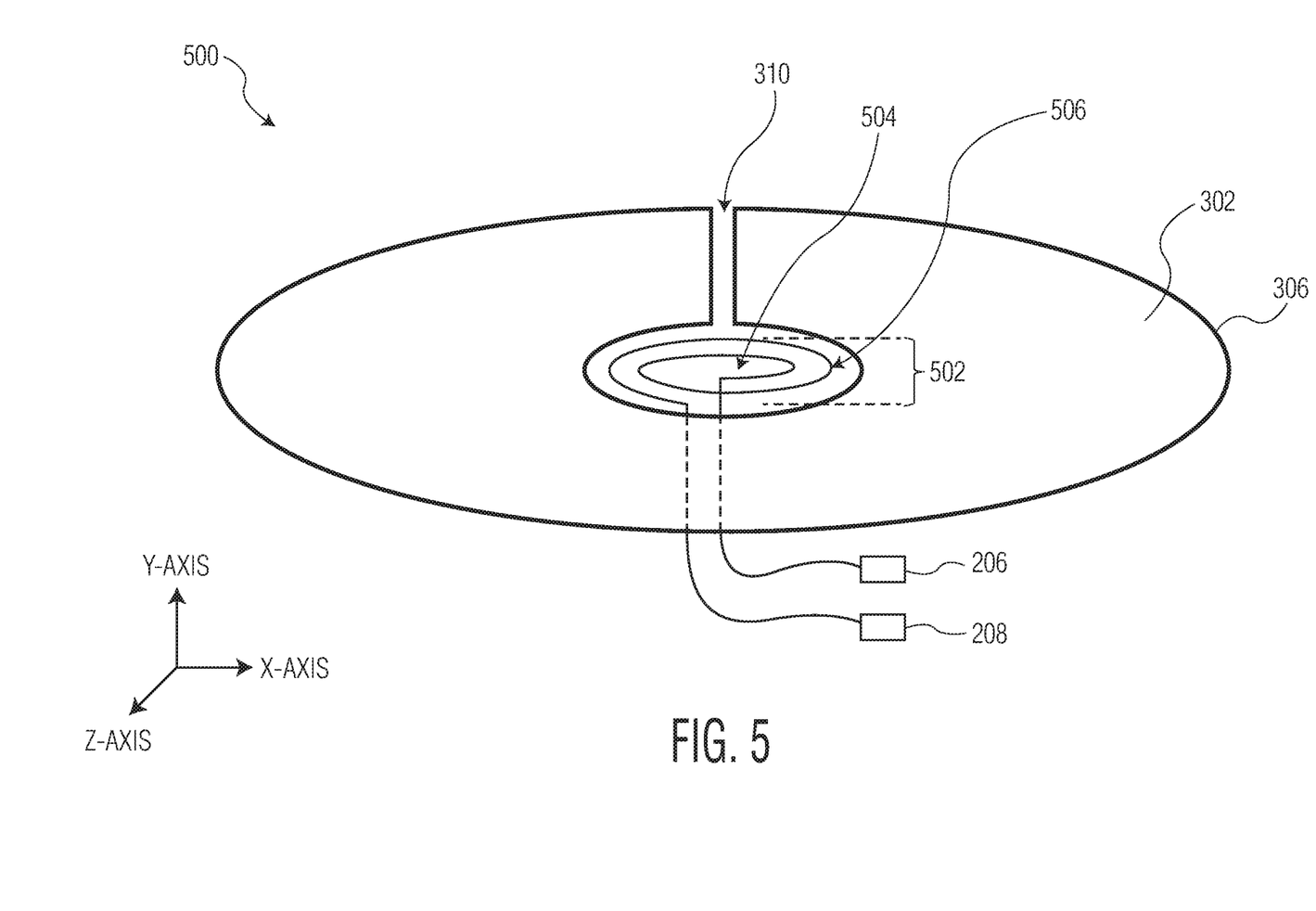
FIG. 5 is a third example near-field antenna.

FIG. 5 is a third example near-field antenna 500 (i.e. planar wire coil). The third example near-field antenna 500 shows the electric (E) field antenna 300 (see FIG. 3) in an x-z plane and the second example magnetic (H) field antenna 502 also in the x-z plane.

The magnetic (H) field antenna 502 includes a dielectric core 504 (e.g. substrate, ferrite, air, etc.), a wire coil 506 (L) also in the x-z plane, a first feed point 206 and a second feed point 208.

Figure 6:
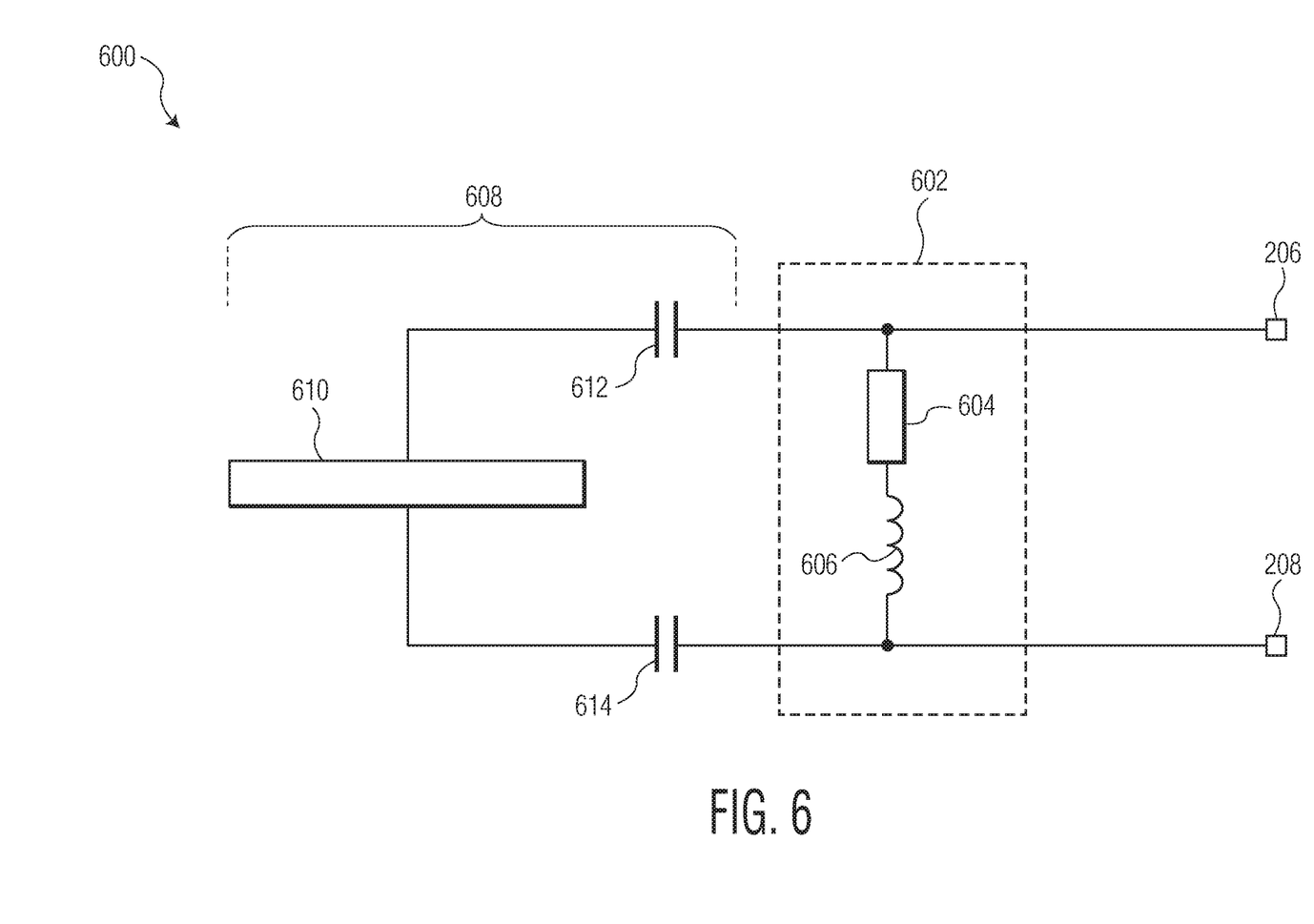
FIG. 6 is an example idealized electrical equivalent of either the second or third near-field antennas.

FIG. 6 is an example idealized electrical equivalent 600 of either the second 400 or third 500 near-field antennas. The example idealized antenna 600 includes an H-field antenna 602, having a resistance 604 and an inductance 606, and an E-field antenna 608, having a conductive structure 610 and capacitances (Ca) 612, 614 due to the galvanic isolation between the H-field antenna 602 and the E-field antenna 608.

Feeding connections 206 and 208 coupled to the wire coil in the H-field antenna 602 are also shown. Parasitic capacitors may, in some example embodiments, also be formed between ends of the H-field antenna's 602 wire coil connecting to the feed points 206, 208 and the conductive structure 610.

Figure 7:
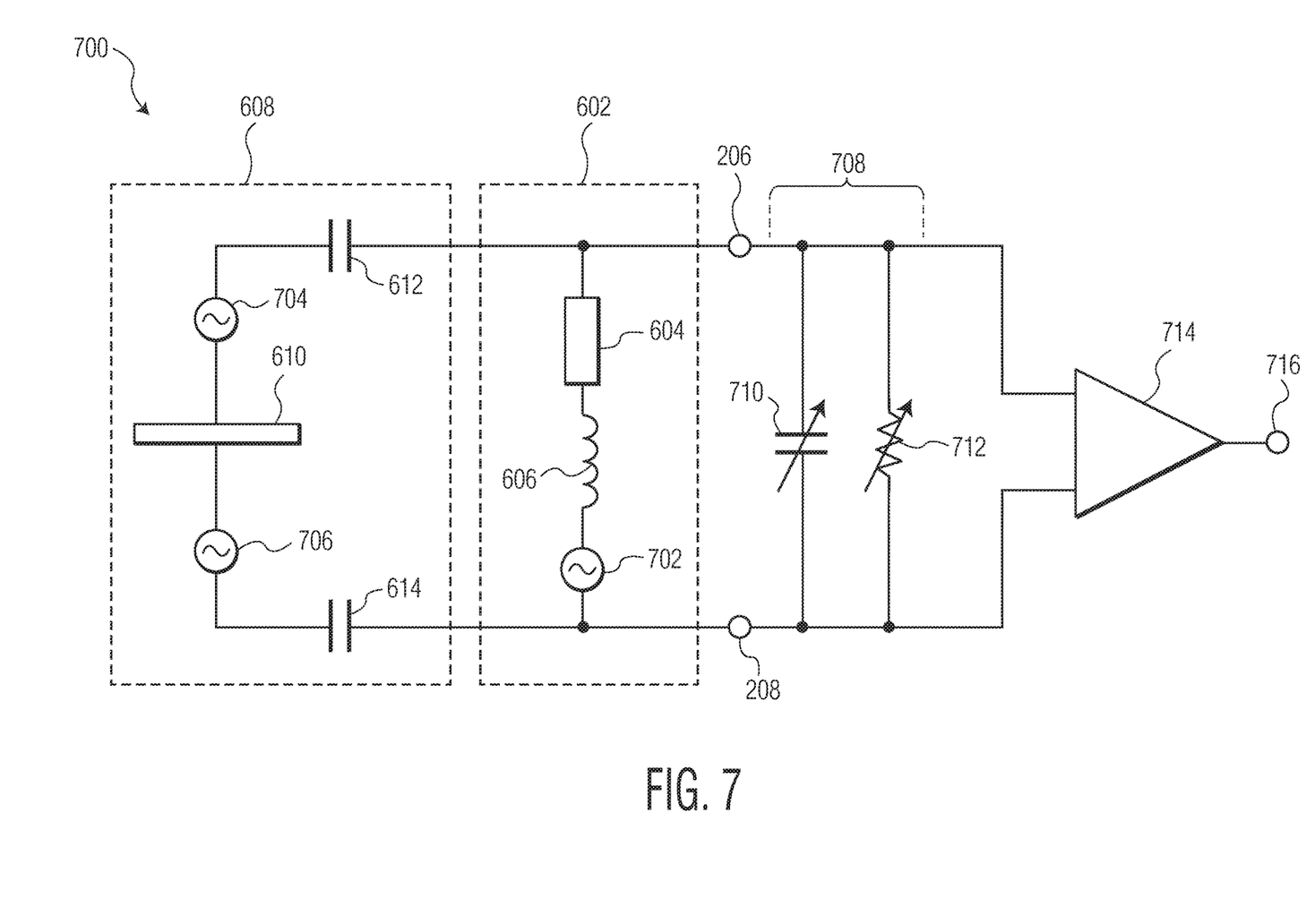
FIG. 7 is an example idealized electrical equivalent of a near-field device configured to receive a communications signal.

FIG. 7 is an example idealized electrical equivalent 700 of a near-field device configured to receive a communications signal. The example idealized receiver 700 includes the H-field antenna 602, shown in FIG. 6, but now having an induced voltage 702. The example idealized receiver 700 also includes the E-field antenna 608, shown in FIG. 6, but now having induced voltages 704 and 706.

Tuning circuit 708 is coupled to the first and second feed points 206, 208 and includes a variable tuning capacitance (Ct) 710 and a variable tuning resistance (Rt) 712. An LNA 714 (low noise amplifier) is coupled between the tuning circuit 708 and a communications signal interface 716.

The magnetic 602 and the electric 608 antennas in some example embodiments are tuned to the receive frequency (e.g. 10.6 MHz) using the variable tuning capacitance (Ct) 710. The variable tuning resistance (Rt) 712 is used to tune the antenna system to a required bandwidth, for example 400 KHz. Sufficient bandwidth is required to allow the RF signal passing the antennas 602, 608 without distortion. However, the bandwidth should not be too large so as to reduce unwanted interference signals which are close to the receive channel.

The received RF signal is further amplified by the low noise amplifier 714 and further processed by additional radio circuits (not shown) coupled to the communications signal interface 716.

In some example embodiments these receiver circuits are embedded in a same substrate as the E-field antenna 608; however, the E-field antenna 608 is also galvanically insulated from these receiver circuits.

Figure 8:
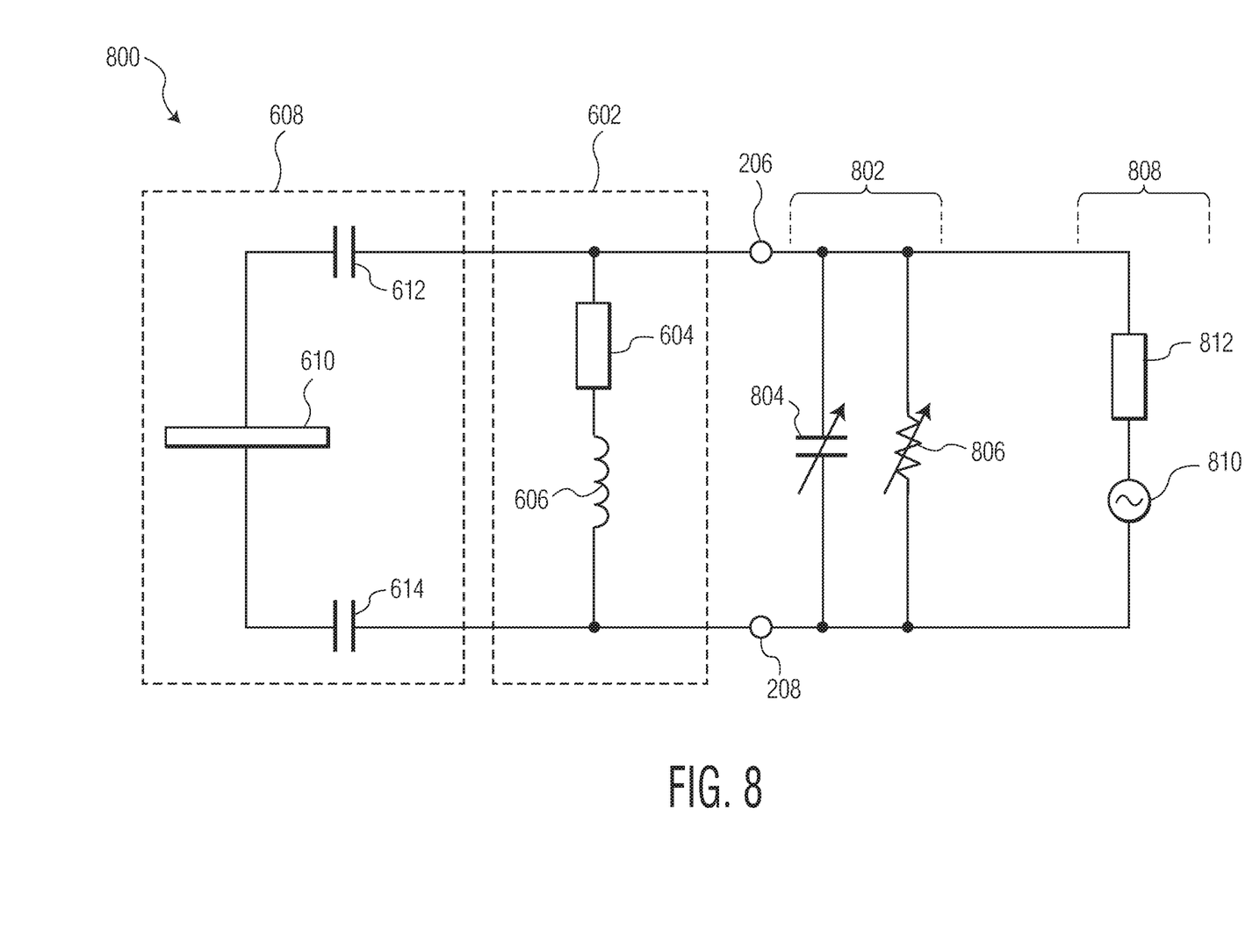
FIG. 8 is example idealized electrical equivalent of a near-field device configured to transmit a communications signal.

FIG. 8 is example idealized electrical equivalent 800 of a near-field device configured to transmit a communications signal. The example idealized transmitter 800 includes the H-field antenna 602 and the E-field antenna 608 shown in FIG. 6.

Tuning circuit 802 is coupled to the first and second feed points 206, 208 and includes a variable tuning capacitance (Ct) 804 and a variable tuning resistance (Rt) 806. The tuning circuit 802 is also coupled to a transmit source 808 having a transmit voltage source 810 and an impedance 812. The transmit source 808 provides an RF signal to the antennas 602, 608 that generate near-field signals.

In some example embodiments these transmitter circuits are embedded in a same substrate as the E-field antenna 608; however, the E-field antenna 608 is also galvanically insulated from these transmitter circuits.

Using the H-field and E-field antennas just described increases a communications range between other near-field devices without increasing power consumption. These near-field antennas also have a higher quality factor, thereby reducing current consumption for a given signal broadcast strength.

Various example embodiments of these near-field antennas are not restricted for use near a human or animal body but could alternately be embedded in a wearable product (e.g. consumer lifestyle and healthcare) to increase the communication range between the wireless devices. The antennas may also be embedded within a hearing aid, an earbud, a smart watch or a smart phone.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field antenna, comprising:
a magnetic (H) field antenna;
an electric (E) field antenna;
wherein the E-field antenna is galvanically insulated from the H-field antenna;
wherein the E-field antenna is configured to be inductively charged by the H-field antenna;
wherein the H-field antenna includes a first and second portion;
wherein the E-field antenna, includes a planar surface and an opening;
wherein the H-field antenna is positioned within the opening;
wherein the first portion of the H-field antenna is on one side of the planar surface; and
wherein the second portion of the H-field antenna is on an opposite side of the planar surface.

2. The antenna of claim 1:
wherein the E-field antenna is dielectrically coupled to the H-field antenna.

3. The antenna of claim 1:
wherein the H-field antenna is a small loop antenna;
wherein the E-field antenna is a short-loaded dipole antenna; and
wherein the short-loaded dipole antenna is configured to be charged by the small loop antenna.

4. The antenna of claim 1:
wherein the H-field antenna is a wire coil;
wherein the E-field antenna is a conductive structure; and
wherein the conductive structure is configured to be charged by the wire coil.

5. The antenna of claim 4:
wherein the coil includes a dielectric core including at least one of ferrite or air.

6. The antenna of claim 1:
wherein the opening overlaps a center of the E-field antenna.

7. The antenna of claim 1:
wherein the first and second portions are substantially equal.

8. The antenna of claim 1:
wherein sizes of the first and second portions are mechanically adjustable.

9. The antenna of claim 1:
wherein a longitudinal axis of the H-field antenna is perpendicular to the planar surface of the E-field antenna.

10. The antenna of claim 1:
wherein the planar surface includes a slot coupling an outer edge of the planar surface and an inner edge at the opening.

11. The antenna of claim 1:
further comprising,
a set of feed points coupled to the magnetic field antenna; and
a transmitter and/or receiver circuit;
wherein the E-field antenna is galvanically insulated from the transmitter and/or receiver circuit.

12. The antenna of claim 11:
wherein the transmitter and/or receiver circuit includes at least one of: a variable tuning capacitor, a variable resistor, or a low noise amplifier.

13. The antenna of claim 1:
wherein the H-field antenna includes a wire coil;
wherein the E-field antenna includes a conductive structure; and
wherein the coil and conductive structure are in a same plane.

14. The antenna of claim 1:
wherein the near-field antenna is an electromagnetic induction (NFEMI) antenna.

15. The antenna of claim 1:
wherein the antenna is embedded within at least one of: a wearable device, a hearing aid, an earbud, a smart watch or a smart phone.

16. The antenna of claim 1:
wherein the magnetic (H) field antenna communicates using non-propagating quasi-static H fields; and
wherein the electric (E) field antenna communicates using non-propagating quasi-static E fields.

17. The antenna of claim 1:
wherein the E-field antenna planar surface is a flat plate.

18. The antenna of claim 1:
wherein the E-field antenna planar surface is a contiguous layer.

19. A wearable device including a near-field antenna, wherein the near-field antenna comprises:

a magnetic (H) field antenna;
an electric (E) field antenna;
wherein the E-field antenna is galvanically insulated from the H-field antenna;
wherein the E-field antenna is configured to be inductively charged by the H-field antenna;
wherein the H-field antenna includes a first and second portion;
wherein the E-field antenna, includes a planar surface and an opening;
wherein the H-field antenna is positioned within the opening;
wherein the first portion of the H-field antenna is on one side of the planar surface; and
wherein the second portion of the H-field antenna is on an opposite side of the planar surface.

* * * * *